US009588809B2

(12) United States Patent
Jensen et al.

(10) Patent No.: US 9,588,809 B2
(45) Date of Patent: Mar. 7, 2017

(54) RESOURCE-BASED SCHEDULER

(75) Inventors: Craig Jensen, La Canada, CA (US);
Andrew Staffer, Sylmar, CA (US);
Basil Thomas, Sylmar, CA (US);
Richard Cadruvi, Simi Valley, CA (US)

(73) Assignee: Invistasking LLC, Clearwater, FL (US)

( * ) Notice: Subject to any disclaimer, the term of this patent is extended or adjusted under 35 U.S.C. 154(b) by 1021 days.

(21) Appl. No.: 11/546,514

(22) Filed: Oct. 10, 2006

(65) Prior Publication Data

US 2008/0086734 A1    Apr. 10, 2008

(51) Int. Cl.
G06F 9/46        (2006.01)
G06F 9/48        (2006.01)

(52) U.S. Cl.
CPC ...... *G06F 9/4881* (2013.01); *G06F 2209/485* (2013.01)

(58) Field of Classification Search
None
See application file for complete search history.

(56) References Cited

U.S. PATENT DOCUMENTS

| | | | |
|---|---|---|---|
| 5,675,790 A | 10/1997 | Walls | |
| 5,881,284 A * | 3/1999 | Kubo | 718/100 |
| 5,974,439 A | 10/1999 | Bollella | |
| 6,016,503 A | 1/2000 | Overby et al. | |
| 6,226,728 B1 | 5/2001 | See et al. | |
| 6,260,058 B1 | 7/2001 | Hoenninger et al. | |
| 6,330,583 B1 | 12/2001 | Reiffin | |
| 6,418,459 B1 * | 7/2002 | Gulick | 718/104 |
| 6,591,287 B1 | 7/2003 | More et al. | |
| 6,779,181 B1 | 8/2004 | Yu et al. | |
| 6,823,472 B1 * | 11/2004 | DeKoning et al. | 714/10 |
| 6,938,254 B1 * | 8/2005 | Mathur et al. | 718/104 |
| 7,003,769 B1 | 2/2006 | Yoshimura et al. | |
| 7,006,501 B1 * | 2/2006 | Gura | G06F 13/368 370/395.42 |
| 7,007,090 B1 | 2/2006 | Spangler et al. | |
| 7,076,781 B2 | 7/2006 | Skovira | |
| 7,150,021 B1 * | 12/2006 | Vajjhala et al. | 718/104 |
| 7,181,743 B2 * | 2/2007 | Werme et al. | 718/104 |
| 7,219,347 B1 * | 5/2007 | Waddington | 718/104 |
| 7,386,850 B2 * | 6/2008 | Mullen | 718/104 |

(Continued)

FOREIGN PATENT DOCUMENTS

| | | |
|---|---|---|
| EP | 0 880 139 A2 | 11/1998 |
| JP | 2006-237348 | 8/1994 |

(Continued)

OTHER PUBLICATIONS

Notification of Transmittal of the International Search Report and the Written Opinion of the International Searching Authority, or the Declaration as received in International application No. PCT/US07/013394, 13 pages.

(Continued)

*Primary Examiner* — Tammy Lee
(74) *Attorney, Agent, or Firm* — Precision IP

(57) ABSTRACT

Resource-based scheduling of computer jobs is disclosed. A computer job is scheduled based on utilization of a resource and a utilization criterion that the computer job has pertaining to the resource, in accordance with an embodiment of the present invention.

15 Claims, 4 Drawing Sheets

(56) References Cited

U.S. PATENT DOCUMENTS

| | | | |
|---|---|---|---|
| 7,451,704 B1 | 11/2008 | Gold et al. | |
| 7,480,840 B2 | 1/2009 | Hathorn et al. | |
| 7,552,437 B2* | 6/2009 | Di Luoffo et al. | 718/104 |
| 7,793,308 B2* | 9/2010 | Gusler et al. | 719/328 |
| 7,814,485 B2 | 10/2010 | Morgan et al. | |
| 7,853,948 B2* | 12/2010 | Berstis et al. | 718/102 |
| 7,987,466 B2 | 7/2011 | Nagamatsu et al. | |
| 8,139,243 B2 | 3/2012 | Isshiki et al. | |
| 2001/0010065 A1 | 7/2001 | Chiba | |
| 2001/0032293 A1 | 10/2001 | Korst et al. | |
| 2003/0120778 A1* | 6/2003 | Chaboud et al. | 709/225 |
| 2003/0163589 A1* | 8/2003 | Bunce et al. | 709/250 |
| 2003/0231630 A1 | 12/2003 | Messenger | |
| 2004/0030882 A1 | 2/2004 | Forman | |
| 2004/0215590 A1* | 10/2004 | Kroening | 707/1 |
| 2004/0260748 A1* | 12/2004 | Springer et al. | 709/200 |
| 2005/0044228 A1* | 2/2005 | Birkestrand et al. | 709/226 |
| 2005/0060237 A1* | 3/2005 | Barsness et al. | 705/26 |
| 2005/0071841 A1 | 3/2005 | Hoflehner et al. | |
| 2005/0073508 A1 | 4/2005 | Pittel et al. | |
| 2005/0125793 A1 | 6/2005 | Aguilar et al. | |
| 2005/0240933 A1 | 10/2005 | Barsness et al. | |
| 2005/0240934 A1 | 10/2005 | Patterson et al. | |
| 2005/0246461 A1 | 11/2005 | Accapadi et al. | |
| 2005/0268299 A1* | 12/2005 | Picinich et al. | 718/100 |
| 2006/0123421 A1 | 6/2006 | Loboz | |
| 2006/0150190 A1* | 7/2006 | Gusler et al. | 718/105 |
| 2006/0195848 A1* | 8/2006 | Arndt et al. | 718/104 |
| 2006/0277550 A1 | 12/2006 | Williams et al. | |
| 2007/0143759 A1* | 6/2007 | Ozgur | G06F 9/5033 718/102 |
| 2007/0143765 A1* | 6/2007 | Aridor et al. | 718/104 |
| 2007/0240126 A1* | 10/2007 | Allen | G06F 9/5011 717/130 |
| 2007/0294695 A1 | 12/2007 | Jensen et al. | |
| 2008/0005524 A1 | 1/2008 | Worrall | |
| 2008/0066072 A1* | 3/2008 | Yurekli | G06Q 10/06 718/104 |
| 2008/0086733 A1 | 4/2008 | Jensen et al. | |
| 2011/0087657 A1 | 4/2011 | Jensen et al. | |
| 2012/0054769 A1 | 3/2012 | Jensen et al. | |

FOREIGN PATENT DOCUMENTS

| | | |
|---|---|---|
| JP | 11-184714 | 7/1999 |
| JP | 2001-75832 | 3/2001 |
| JP | 2001-155084 | 6/2001 |
| JP | 2005-011023 | 1/2005 |
| KR | 10-2004-0062941 | 7/2004 |
| RU | 2018945 C1 | 8/1994 |
| RU | 2233470 C2 | 7/2004 |
| SU | 849893 A1 | 1/1996 |
| WO | WO 00/70455 | 11/2000 |
| WO | WO 03/052590 A1 | 6/2003 |

OTHER PUBLICATIONS

Das, R. et al., "Towards Commercialization of Utility-based Resource Allocation" *IEEE* (2006) pp. 287-290.

Feitelson, D. et al., "Parallel Job Scheduling—A Status Report" XP-002456726, *Springer-Verlag Berlin Heidelberg* (2005) 16 pages.

Uttamchandani, S. et al., Chameleon: a self-evolving, fully-adaptive resource arbitrator for storage systems, XP-002456727, 14 pages.

Philip T. Fleege, Brian Jones, "Throttling Activity in a Multi-Tasking Operating System", Motorola, Inc. Technical Developments, Dec. 1, 1997, www.ip.com Prior Art Database, Electronic Publication Jun. 13, 2002, pp. 72-74.

Sujay Parekh, Kevin Rose, et al., "Throttling Utilities in the IBM DB2 Universal Database Server", IBM Research Report, RC23163 (W0403-139), Mar. 23, 2004, IBM Research Division, Thomas J. Watson Research Center and IBM Toronto Laboratory, pp. 1-6.

Eleftherios D. Polychronopoulos, Xavier Martorell, et al., "Kernel-Level Scheduling for the Nano-Threads Programming Model", 1998, High Performance Computing Architecture Laboratory, Department of Computing Engineering and Informatics, University of Patras, Greece and European Center for Parallelism of Barcelona, Department d'Arquitectura de Computadors, Universitat Politecnica de Catalunya, Spain, pp. 337-344.

Panagiotis E. Hadjidoukas, Vasileios K. Barekas, et al., "A Portable Kernel-Mode Resource Manager on Windows 2000 Platforms", High Performance Information Systems Laboratory, Department of Computing Engineering and Informatics, University of Patras, Greece, (7 pages).

Vasileios K. Barekas, Panagiotis E. Hadjidoukas, et al., "An OpenMP Implementation for Multiprogrammed SMPs", http://www.hpclab.ceid.upatras.gr , (9 pages).

Krithi Ramamritham, John A. Stankovic, Wei Zhao, "Distributed Scheduling of Task with Deadlines and Resource Requirements", IEEE Transactions on Computers, vol. 38, No. 8, Aug. 1989, (pp. 1110-1123).

John Regehr, "Hierarchical Loadable Schedulers", Apr. 27, 1999, http://www.cs.utah.edu , (15 pages).

Dawson R. Engler, M. Frans Kaashoek, James O'Toole, Jr., "Exokernel: an operating system architecture for application-level resource management", Mar. 24, 1995, M.I.T. Laboratory for Computer Science, Cambridge, MA, U.S.A., (pp. 1-17).

Jose E. Moreira, "Dynamic Resource Management on Distributed Systems Using Reconfigurable Applications", May 1997, IBM Journal of Research and Development, (23 pages).

Paul Ronald Barham, "Devices in a Multi-Service Operating System", Jul. 1996, Churchill College, University of Cambridge, Ph.D. Dissertation, (pp. i-ix and 1-131).

U.S. Appl. No. 11/471,466, filed Jun. 19, 2006, Office Action, Aug. 19, 2010.

EPO office action for foreign patent application No. 07 777 432.1-2211, dated Oct. 28, 2009, 4 pages.

EPO office action for foreign patent application No. 07 777 320.8-2211, dated Oct. 28, 2009, 3 pages.

Notification of Transmittal of the International Search Report and the Written Opinion of the International Searching Authority, or the Declaration as received in International application No. PCT/US07/012746.

Kuhn, N. et al., "Task decomposition in dynamic agent societies", XP-002456556 (1993) *IEEE*, pp. 165-171.

Lifka, D., "The ANL/IMB SP scheduling system", XP-002456555 (1995) 8 pages.

Notification of Transmittal of the International Search Report and the Written Opinion of the International Searching Authority, or the Declaration as received in International application No. PCT/US07/013452.

Albus, J., "Task Decomposition" *Proceedings of the 1993 International Symposium on Intelligent Control* (1993); pp. 49-51.

Ferreto, T. et al., "Scheduling Divisible Workloads Using the Adaptive Time Factoring Algorithm" (2005) *Springer-Verlag Berlin Heidelberg*, pp. 232-239.

Gerber, R., "Slicing Real-Time Programs for Enhanced Schedulability", XP-002457003 (1997) *ACM*, pp. 525-555.

U.S. Appl. No. 11/546,072, filed Oct. 10, 2006.

U.S. Appl. No. 11/471,466, filed Jun. 19, 2006.

U.S. Appl. No. 12/244,771, filed Oct. 3, 2008.

U.S. Appl. No. 11/546,072, filed Oct. 10, 2006, Notice of Allowance, Jun. 30, 2011.

U.S. Appl. No. 11/471,466, filed Jun. 19, 2006, Final Office Action, Jan. 3, 2011.

U.S. Appl. No. 11/471,466, filed Jun. 19, 2006, Advisory Action, Mar. 22, 2011.

U.S. Appl. No. 12/244,771, filed Oct. 3, 2008, Notice of Allowance, Aug. 24, 2011.

U.S. Appl. No. 12/244,771, filed Oct. 3, 2008, Non-Final Office Action, Mar. 2, 2011.

Office Action, Russian Patent Application No. 2008149052, Applicant: Diskeeper, 3 pages, dated May 27, 2011.

Current Claims, Application No. 2008149052, Applicant Diskeeper, dated May 2011, 4 pages.

(56) References Cited

OTHER PUBLICATIONS

U.S. Appl. No. 11/471,466, filed Jun. 19, 2006, Notice of Allowance, May 1, 2012.
Russian Office Action received in Application No. 2008149050 dated May 30, 2011 (7 pages).
Current Claims of Russian Application No. 2008149050 dated May 2011 (3 pages).
Chinese Office Action received in Application No. 200780022921.6 dated Aug. 24, 2011 (14 pages).
Current Claims of Chinese Application No. 200780022921.6 dated Aug. 2011 (3 pages).
Russian Office Action received in Application No. 2008149048 dated Jul. 8, 2011 (8 pages).
Current Claims of Russian Application No. 2008149048 dated Jul. 2011 (3 pages).
European Office Action received in Application No. 2008149048 dated Dec. 23, 2011 (8 pages).
Current Claims received in Application No. 2008149048 dated Dec. 2011 (2 pages).
Tiago, F. et al., "Scheduling Divisible Workloads Using the Adaptive Time Factoring Algorithm" XP019021392 dated 2005 (8 pages).
Albus, J., "Institute of Electrical and Electronics Engineers" XP000452711 dated Aug. 25, 1993 (3 pages).
Gerber R. et al., "Slicing real-time programs for enhanced schedulability" XP002457003 dated May 1997 (31 pages).

U.S. Appl. No. 13/287,855, filed Nov. 2, 2011, Notice of Publication, Mar. 1, 2012.
U.S. Appl. No. 11/471,466, filed Jun. 19, 2006, Office Action, Nov. 21, 2011.
Fukami Patent Office, Office Action, in application No. 2009-516502, dated Jun. 5, 2012, 6 pages.
Current Claims in application No. 2009-516502, dated Jun. 2012, 3 pages.
East IP Intellectual Property Services, Office Action in application No. 200780022921.6, dated Jul. 26, 2012, 6 pages.
Current Claims for application No. 200780022921.6, dated Jul. 2012, 2 pages.
Current Claims in application No .2007261607, dated Jul. 2012, 6 pages.
Australian Government, "Patent Examination Report No. 1", in application No. 2007261607, 4 pages, dated Jul. 25, 2012.
Office action issued in corresponding Korean patent application No. 10-2009-7000982, dated May 27, 2013, including English translation, 12pp.
Final Rejection mailed Apr. 2, 2013 for corresponding Japanese Patent Application No. 2009-516502, 6pp including English translation.
Bach, Maurice J.; "The Design of the UNIX Operating System: Chapter 8 Process Scheduling and Time"; Jan. 1, 1986; Prentice-Hall, Inc.; USA; pp. 247-258 (12pp).
Office action issued in corresponding EP Application No. 07 795 838.7, dated Feb. 19, 2014.
Inside InvisiTasking (A Technology Report for Software Architects) (2008) Diskeeper Corporation 13 pages.

* cited by examiner

RESOURCE-BASED SCHEDULER

FIELD OF THE INVENTION

The present invention relates to scheduling computer jobs. In particular, embodiments of the present invention relate to scheduling computer jobs based on resource utilization criteria of the particular jobs and utilization of computer resources to be used by the jobs.

BACKGROUND

Today's computer operating systems (O/S) utilize multitasking schedulers to give the appearance of more than one computer job (e.g., process) running at the same time. There are many different scheduling algorithms, but generally the concept is that a small time slice known as a quantum is given to one thread of a process and then another thread of the process or another process, etc. The length of the quantum is very small, typically in the range of 20 to 120 milliseconds. Due to the human perception of time, it appears that the jobs are running concurrently.

The central processing unit (CPU) tends to be the fastest component of most computer systems, while other computer resources such as disk I/O, network I/O, and even memory tend to be much slower. For example, disk I/O may be about a million times slower than the CPU if measured in terms of data transfer from the disk and data transfer within the CPU. As a result, the CPU often waits for these slower resources. For example, a three-gigahertz CPU often sits idle while waiting for a disk drive to retrieve data at an average access time measured in milliseconds.

Since several different jobs are often vying for the same resources, jobs often collide with each other, which results in the slowing of one or more of the jobs. From a user's perspective, job collisions manifest themselves as unresponsive applications, jerky cursor movement and slowly rendered graphics.

Throttling is a technique for minimizing these negative impacts. Throttling prevents an application or job from using more than an allocated amount of resources. Types of throttling include disk I/O throttling, CPU throttling and network throttling. For example, CPU throttling can involve establishing a target CPU utilization limit for an application and forcing the application to stop working if the application exceeds the target limit. Throttling is sometimes applied to computer resources for maintenance applications or less important computer jobs. While throttling has benefits, the computer job's resource use is not totally transparent to other jobs and applications.

The above problems are even more perplexing because computer resources are generally wasted over a 24-hour period. For example, most desktops utilize less than five percent of the computer's available resources, and high traffic servers often utilize around 20 percent. Even computers that utilize 80-90 percent of resources still have 10-20 percent of resources available.

To recover and utilize these otherwise lost resources, what is needed is a technique that allows one or more jobs to execute in a computer system without significantly impacting other jobs or applications. The technique should not consume a user's time in scheduling the job nor should it negatively impact the user's interaction with the computer system when the job is running.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
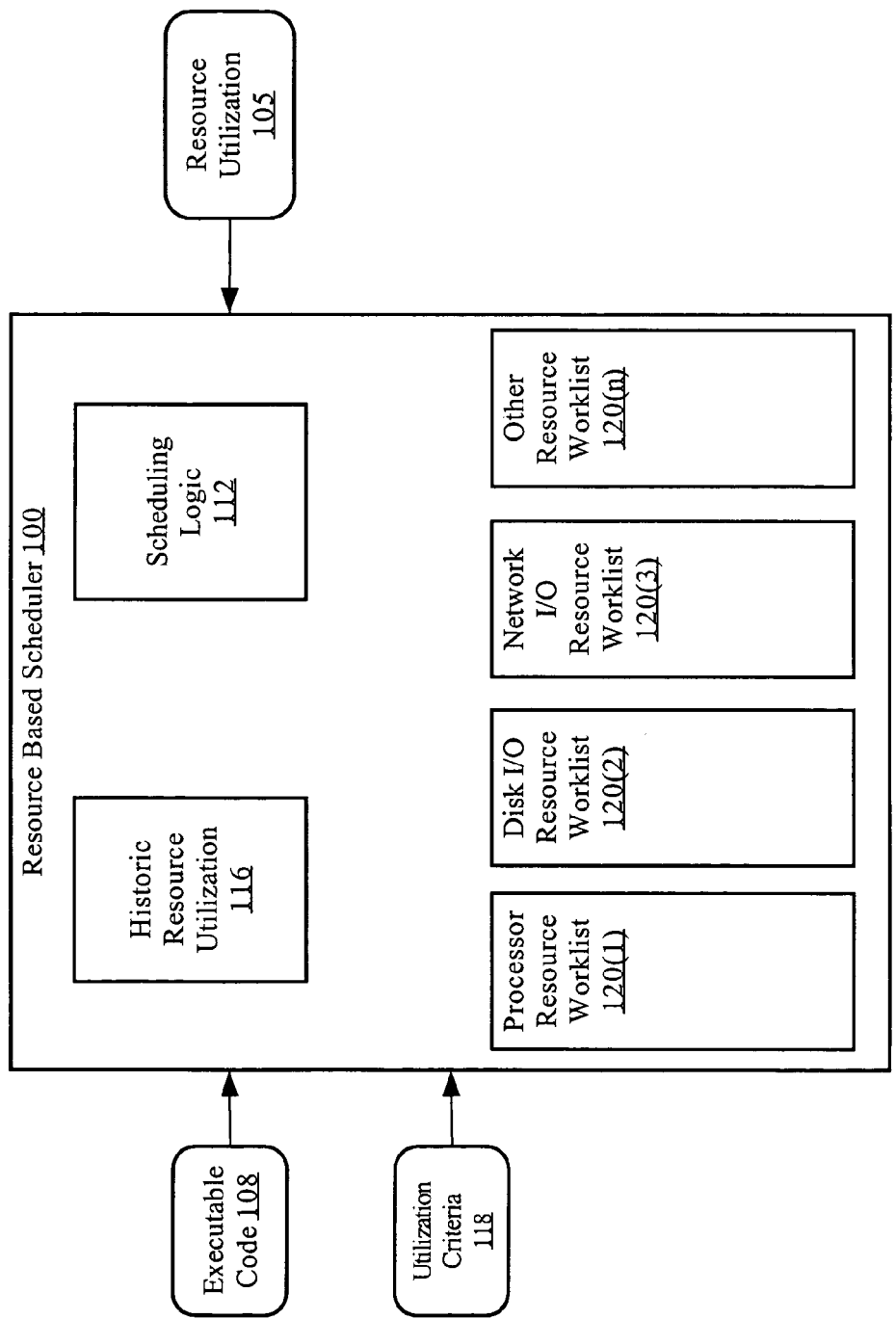
FIG. 1A is a diagram of a resource-based scheduler having resource-based scheduling worklist, in accordance with an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

The majority of computers do not utilize all of their resource capacity 100 percent of the time. This is typically true even of computers that seemingly are in high use twenty-four hours a day, seven days a week, as well as computers that are only turned on for a portion of each day. Therefore, computer time and resources are wasted. For example, over a twenty-four hour period, a computer system that is used quite heavily, and which may have brief spikes in activity, may on average use only about five to twenty percent of its resources.

A computer job is scheduled based on utilization of a resource and a utilization criterion that the computer job has pertaining to the resource, in accordance with an embodiment of the present invention. For example, a computer job might have a utilization criterion that a disk I/O resource has 60 percent available capacity in order for the computer job to be scheduled. If the available capacity of the disk I/O resource is less than 60 percent, then the computer job is not scheduled, in this embodiment.

In one embodiment, a resource-based scheduler (RBS) puts each computer job onto at least one of several different resource-based scheduling worklist. These resource-based scheduling worklists include, but are not limited to, a disk I/O scheduling worklist, CPU scheduling worklist, and network I/O scheduling worklist. Thus, a particular scheduling worklist comprises computer jobs waiting to use the particular resource. Each of the computer jobs has a utilization criterion pertaining to the particular resource, in this embodiment. The RBS selects one of the resources to be next to have a computer job scheduled. The selection is based on a priority of the resource, in one embodiment. For example, a disk I/O resource might have a higher priority than a CPU resource. In one embodiment, resources that are designated as slower resources are given a higher priority than resources that are designated as faster resources.

After selecting which resource is to be scheduled, the RBS selects for execution one of the computer jobs from the worklist corresponding to the selected resource. The RBS selects the computer job based on criteria that match the available capacity of the resource with the utilization criterion of the computer jobs, in one embodiment. However, the RBS may also use other factors such as the priority of the computer jobs, required execution order of computer jobs, the order in which computer jobs were placed on the worklist, etc.

Note that, in one embodiment, the RBS allows efficient utilization of multiple computer resources by scheduling each computer job when the resources to be utilized by the job are (fully or partially) available even though other resources not needed by that job are being (fully or partially) utilized by other jobs and reduces impingement on the performance of the other jobs.

Resource Based Scheduler

FIG. 1A is a diagram of a resource-based scheduler (RBS) 100 having resource-based scheduling worklists 120, in accordance with an embodiment of the present invention. The RBS 100 pro-actively schedules computer jobs based on available capacity of different computer resources. As examples, the different resources could include, but are not limited to, CPU, disk I/O, network I/O, video, memory, keyboard, network resource, etc. As used herein, the term "computer job" or "job" includes, but is not limited to, a computer process, a thread, a micro-job (discussed herein below), or any portion of executable computer code. The RBS 100 may allow each computer job to receive its requirement of resources without colliding with any other jobs' requirement for resources. The RBS 100 is able to determine when a particular resource is only partially utilized, and to allocate the un-utilized portion to a selected job, with minimal impingement on any of the other jobs already utilizing the resource, in one embodiment.

In one embodiment, the RBS 100 schedules computer jobs for a variety of different resources. The different resources may or may not be on the same computer system as the RBS 100. For example, the RBS 100 schedules computer jobs to utilize a resource that is accessed via a network, in one embodiment. As a particular example, the resource may be accessed via the Internet.

Thus, in one embodiment, the RBS 100 receives computer jobs seeking access to a variety of resources and makes scheduling decisions as to which of the computer jobs should be scheduled to utilize which of the resources, as well as when the computer jobs should be scheduled.

Computer Resource Utilization

The RBS 100 inputs resource utilization information 105, which describes utilization of various computer resources. The utilization may pertain to an interval or a specified point. The utilization may be an average utilization over a specified interval. For example, a resource's utilization can be specified as an average utilization over a specified time interval. As a particular example, a CPU resource at 30 percent utilization may pertain to average utilization over a recent time interval. The interval is measured in quanta, in one embodiment.

The utilization is numeric-based, in one embodiment. For example, the utilization might be based on the number of operations waiting to execute at a specified point in time. For example, if a resource has "x" operations waiting to execute, the utilization could be "x". As another example of a numeric based utilization of a resource, the utilization is based on the number of requests to utilize a particular resource. For example, the utilization is based on the total number of requests that each process has to utilize a particular resource, in one embodiment. Numeric based utilization may pertain to a point or an interval. For example, numeric based resource utilization is based on an average number of operations waiting to execute over a particular time interval, in one embodiment. In another embodiment, numeric based resource utilization is based on the number of operations waiting to execute at a particular point.

In one embodiment, the RBS 100 estimates future resource utilization, based on the resource utilization 105. For example, based on the number of requests to utilize a particular resource (and perhaps other factors), an estimate is made of future resource utilization. As another example, based on the percentage utilization of a particular resource (and perhaps other factors), an estimate is made of future resource utilization.

Computer Job Utilization Criteria

The RBS 100 also inputs utilization criteria 118 for the jobs to be scheduled. The utilization criteria 118 pertain to the resources. For example, resource thresholds may be used, wherein the RBS 100 only schedules a computer job if resource utilization by other jobs is below the threshold. An example of using resource thresholds is that the RBS 100 only schedules a particular computer job to use disk I/O if the disk I/O has an available capacity of less than 60 percent. The RBS 100 has an Application Program Interface (API) for an application that owns the computer job to provide utilization criteria 118, in one embodiment. An example API is provided herein.

The utilization criteria 118 are based on time, in one embodiment. Basing utilization criteria 118 on a percentage is an example of a time-based criteria. The utilization criteria 118 are numeric based, in one embodiment. An example of numeric based utilization criteria 118 is the number of operations that are waiting to execute on a particular resource. Another example of numeric based utilization criteria 118 is a number of requests that are received to use a resource. For example, the utilization criterion 118 of a particular process is based on the number of requests to use a particular resource.

The RBS 100 stores historic utilization information 116, in one embodiment. The historic utilization information 116 describes prior resource utilization by one or more of the jobs. For example, the fact that a computer job utilized 30 percent of the network I/O resource is stored for future reference. The RBS 100 uses the historic utilization information 116 to determine utilization criteria for a computer job to be scheduled, in one embodiment. For example, based on one or more previous times that the computer job utilized a particular resource, the RBS 100 determines that a computer job has a utilization criterion of "x" percent for the particular resource. The RBS 100 then uses this utilization criterion when scheduling the computer job.

The RBS 100 also inputs executable code 108 of the jobs to be scheduled, which the RBS 100 analyzes to determine utilization criteria.

Deferring Scheduling Decisions

In one embodiment, the determination as to whether a computer job should be allowed to utilize a particular resource may be deferred. For example, a particular computer job may have a utilization criterion that allows a specified number of requests from other computer jobs to be serviced prior to the resource based scheduler even considering whether to schedule the particular computer job. In one embodiment, the RBS defers execution of the particular computer job if the utilization of the resource is above a threshold. The particular computer job specifies the number of requests from other computer jobs that can be serviced prior to scheduling the particular computer job. In one embodiment, after the number of requests has been serviced, the particular computer job is scheduled next. In another embodiment, after requests have been serviced, the RBS determines whether or not to allow the particular computer job to have the resource.

In one embodiment, the resource based scheduler has a normal worklist for resource requests that should be satisfied without delay and a deferred worklist for resource requests that can be deferred. Each entry in the deferred list may be stamped with a current request number when the request is put on the deferred list. These deferred requests may be ordered based on which deferred request should be serviced first. In one embodiment, there are multiple deferred worklists. When the RBS determines to start a new request, the RBS might first look at the deferred list to see if any requests are expiring and then take them next, versus the normal list.

Resource Based Scheduling Worklists

The RBS 100 has a resource-based scheduling worklist 120 for each resource for which a computer job might be scheduled to use, in one embodiment. For example, the RBS 100 has a CPU resource worklist 120(1), a disk I/O worklist 120(2), a network I/O worklist 120(3) and other resource worklists 120(n). Examples of other resources worklists include, but are not limited to, a network resource worklist, a video resource worklist, a keyboard resource worklist. Each worklist 120 comprises jobs that are waiting to utilize the resource corresponding to that resource. So as to not obscure the diagram, not all possible resource-based scheduling worklists are depicted in FIG. 1A. In one embodiment, a particular worklist is for computer-jobs that utilize a combination of resources. In one embodiment, there are two or more worklists for a particular resource, wherein each worklist corresponds to a different priority. For example, computer jobs with a high priority go into one worklist, a medium priority on another, etc. A worklist may be ordered or not ordered.

In one embodiment, the RBS 100 determines which worklist to place a computer job on based on analysis of the executable code 108. For example, the RBS 100 examines instructions in the executable code 108 of the computer job to determine what resources the computer job needs, in one embodiment.

In one embodiment, when a sufficient amount of a computer resource is available, the RBS 100 gives the resource to one of the computer jobs in the worklist corresponding to that resource. For example, the scheduling logic 112 selects one of the computer jobs on the worklist based on available capacity of the resource and utilization criteria of the computer jobs. Other selection criteria can be used. The selection criteria include, but are not limited to, order in which jobs were added to the worklist, computer job priority (e.g., process priority, thread priority), and matching the resource's available capacity with resource needs of the jobs. The selection may be based on any combination of these criteria, as well as other criteria not specifically mentioned.

Resource Based Scheduler without Resource-Based Scheduling Worklists

Figure 1B:
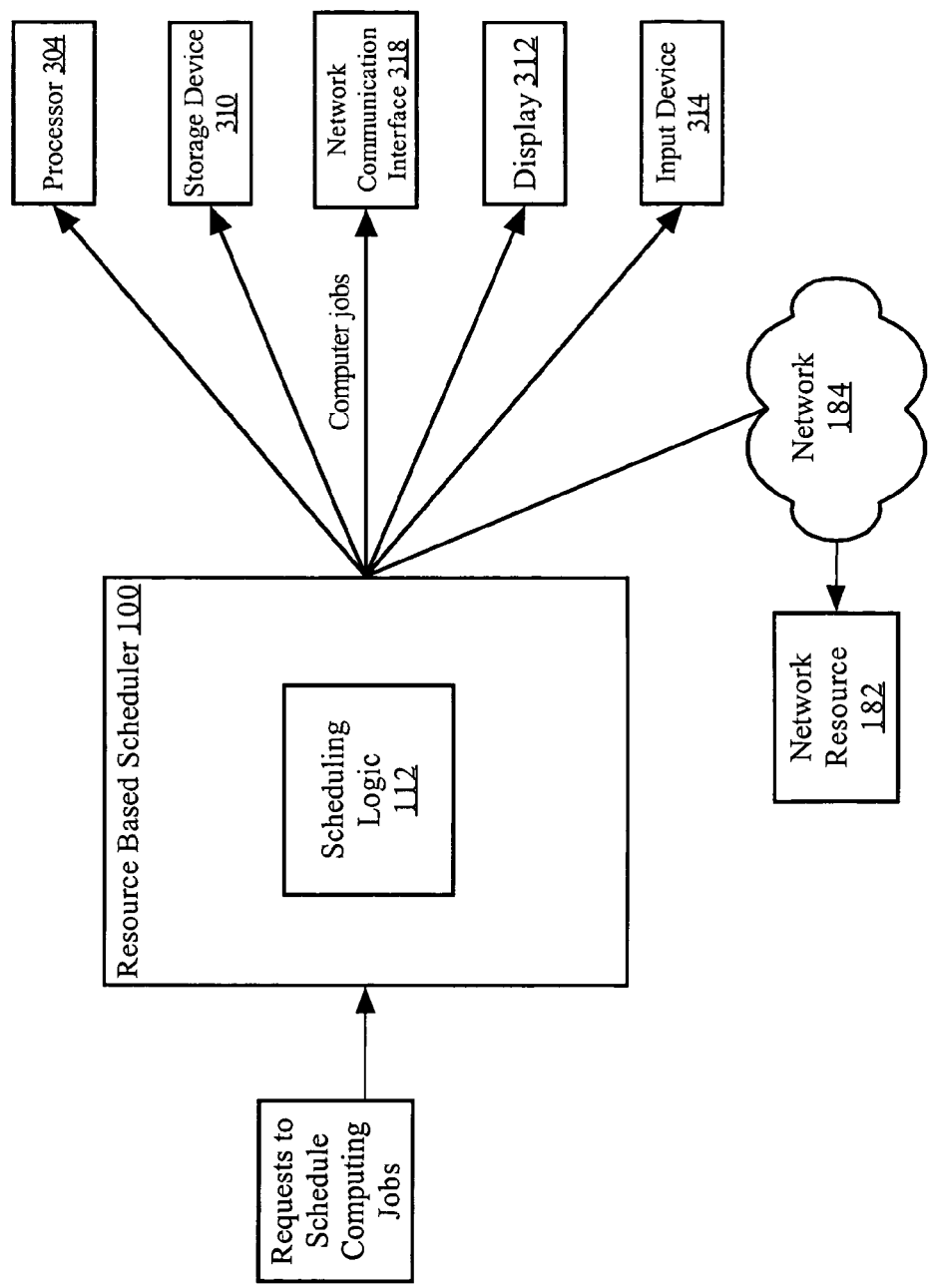
FIG. 1B is a diagram of a resource-based scheduler, in accordance with another embodiment of the present invention.

In one embodiment, the RBS 100 does not use scheduling worklists that correspond to the various computer resources. Referring to FIG. 1B, the RBS 100 receives requests to schedule computer jobs on an ongoing basis, in no particular order. For example, as an application desires to have a computer job or jobs executed, the application sends a request to the RBS 100 to schedule one or more computer jobs. The RBS 100 determines or is informed what resource or resources are to be used by a particular computer job. Examples of resources include a processor 304, storage device 310, display 312, input device 314, and network communication interface 318, and a network resource 182 that is accessed via network 184.

The RBS 100 determines or is informed as to the utilization of the particular resource. The RBS 100 also determines or is informed as to utilization criteria the computer job has pertaining to the particular resource. Based on utilization of the particular resource and the utilization criteria, the RBS 100 determines whether to schedule the particular computer job to utilize the particular resource. For example, if the utilization of the network communication interface 318 meets the utilization criteria of a computer job, the RBS 100 schedules the computer job to execute using the network communication interface 318. If not, the RBS 100 does not schedule the computer job to use the network communication interface 318. Rather, the RBS 100 may wait and schedule the computer job when utilization of the network communication interface 318 meets the utilization criteria of a computer job.

Prioritizing Resources

The computer resources are prioritized for scheduling purposes, in one embodiment. For example, CPU, disk I/O, network I/O and other resources may be ranked based on relative speed of a resource. For example, a disk I/O might be designated as a slower resource than a CPU resource and therefore be given a higher priority. Similarly the network I/O resource may be faster than the disk I/O but slower than the CPU. The network resource would thus be given higher priority than the CPU but less than the disk I/O. If the RBS 100 takes into account slower resources and schedules these resources with a higher priority, then delay to faster resources such as a CPU may be minimized.

Application Based Example

The following is an example of resource-based scheduling in an application. As examples, the application may be a defragmenter or a virus scanner. In this example, Computer job A is at the top of the disk I/O scheduling worklist 120(2) and has a utilization criterion of 60 percent disk I/O available capacity and Computer job B, which is next on the disk I/O scheduling worklist 120(2), has a utilization criterion of 20 percent disk I/O available capacity. If the disk I/O has 30 percent available capacity, then the RBS 100 would not schedule Computer job A because the disk I/O does not have enough available capacity. However, Computer job B could be scheduled. The RBS 100, in this case, makes use of the 30 percent disk I/O available capacity by scheduling an appropriate computer job (Computer job B) to utilize the disk I/O instead of wasting it. If the RBS 100 had given the disk I/O resource to computer job A, which required 60 percent disk I/O, this may have caused a computer job collision as more than one hundred percent of the disk I/O resource would have been allocated.

Kernel Level Resource Based Scheduler

In one embodiment, the RBS 100 is implemented in an O/S at the kernel level. In such an embodiment, the kernel level RBS 100 has full knowledge of the entire worklist of computer jobs (e.g., threads) that are requesting execution. Thus, the RBS 100 can order the execution based on resource availability without the need to determine the percentage utilization of any resource. This is because the RBS 100 already has full control to schedule the various resources. There is no need to measure, it already knows as it is the one allocating the resources.

Process Flow

Figure 2:
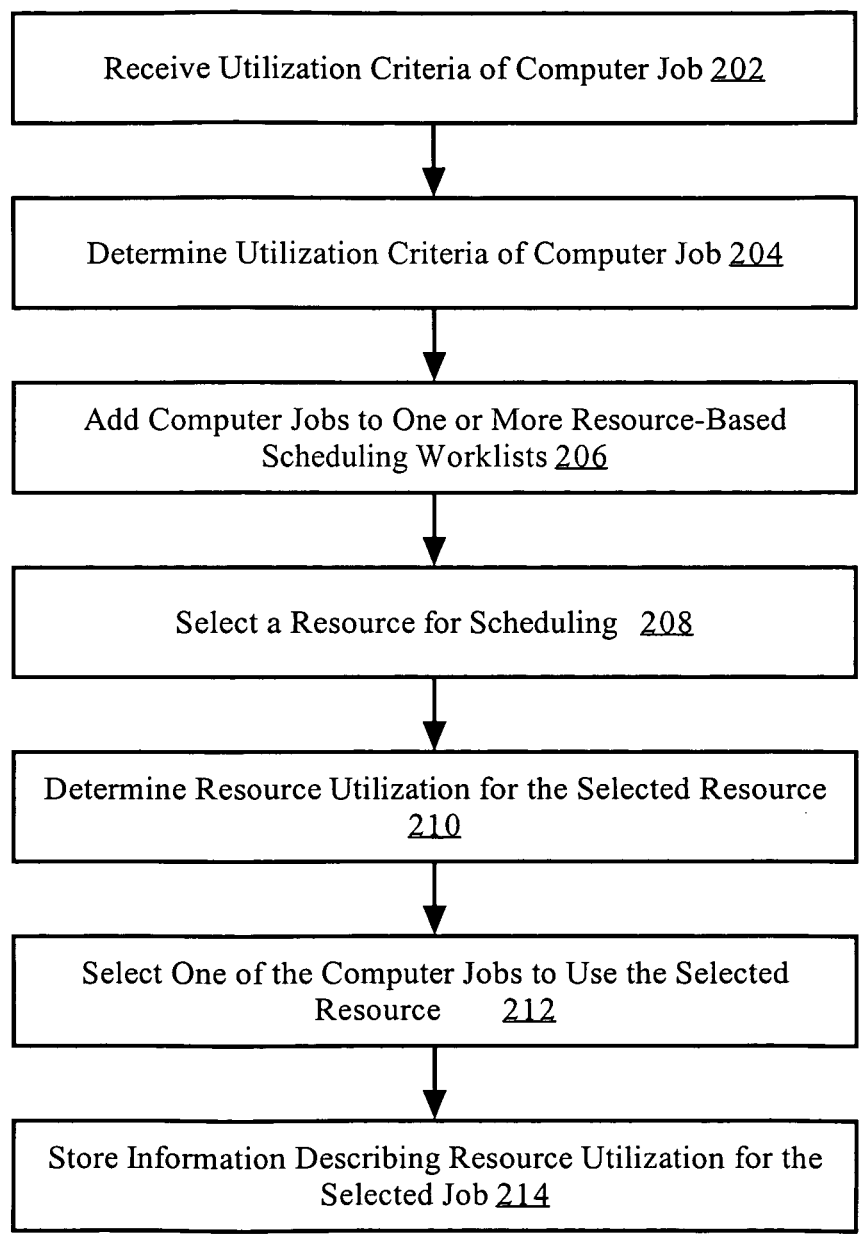
FIG. 2 is a flowchart of resource-based scheduling, in accordance with an embodiment of the present invention.

FIG. 2 is a flowchart illustrating steps of a process 200 for resource-based scheduling, in accordance with an embodiment of the present invention. The steps of process 200 are described in a particular order for convenience of explanation. However, the steps may occur in a different order. Moreover, steps may be repeated many times. In step 202, the RBS 100 receives utilization criteria of one or more jobs. For example, an application program provides the utilization criteria to the RBS 100. The application can specify different criteria for different computer jobs. It is not necessary for the application to specify the utilization criteria for its computer jobs.

The application sends parameters to the RBS 100 to control resource utilization, in accordance with an embodiment of the present invention. Control of resource utilization includes, but is not limited to; disk I/O, CPU and network. For example, the application can request a computer job be executed pending any combination of threshold levels of the above three resources, or other resources. Moreover, the application can specify different resource threshold levels for different computer jobs. For example, the application specifies a different resource threshold level with each computer job, in accordance with one embodiment. Therefore, fine-grained resource management is possible.

In step 204, the RBS 100 determines utilization criteria of one or more jobs. In one embodiment, the RBS 100 determines expected utilization of a particular resource by a computer job, wherein the utilization criterion is based on the expected resource utilization. In one embodiment, the RBS 100 determines the expected utilization of a particular computer job by examining instructions in the particular computer job. In one embodiment, the RBS 100 bases the expected utilization on a stored value that describes previous utilization of the resource by the particular computer job.

In step 206, computer jobs are added to resource-based scheduling worklists. For example, a particular process, or at least threads of a particular process, are placed on at least one resource-based scheduling worklist. As more jobs request to be scheduled, they are added to the resource-based scheduling worklists. In one embodiment, requests from many different computer jobs are placed on the worklist. In one embodiment, the requests can be satisfied by a computer job being scheduled to utilize a particular resource. In one embodiment, a computer job is inserted to a location on the worklist based on the priority of the computer job. Because the order in which threads of a process execute may be important, computer jobs (e.g., threads) are located on the worklist to preserve desired execution order, in one embodiment.

In step 208, a particular computer resource is selected to be utilized. For example, the RBS 100 may determine that a computer resource that has been designated as slower should have a higher priority. As a particular example, the RBS 100 selects the disk I/O resource. However, the selection can be based on other factors such as thread flow, computer job priority, (e.g., process priority, thread priority), the number of jobs (e.g., threads) waiting to execute on each worklist and the availability of other resources required by a job (e.g., thread or process).

In step 210, the RBS 100 determines utilization of the selected computer resource. The utilization may be based on activity over a recent interval. For example, the utilization may be based on any convenient measure such as, the last "x" quanta, or a recent time period. However, the utilization does not need to be based on an interval. For example, the utilization might be based on the number of operations that are waiting to execute at a particular point in time.

When the RBS 100 calculates resource utilization, it is the resource utilization of jobs other than the jobs associated with a particular application that is measured, in accordance with one embodiment of the present invention. The following example in which the CPU utilization threshold is set to 20 percent is used to illustrate. If CPU utilization is below 20 percent prior to allowing computer jobs associated with a particular application to execute, CPU utilization may increase to over 20 percent when the computer jobs execute. This increase beyond 20 percent is not considered a CPU resource utilization violation, in this example. Similar principles may apply to network, disk I/O resources, and other resources.

In one embodiment, the RBS 100 estimates utilization of the selected computer resource over a future time interval. The RBS 100 may estimate future utilization based on recent utilization of the resource. As a particular example, recent utilization of a network I/O is measured (or otherwise learned). Based on the recent network I/O utilization, an estimate is made of network I/O utilization for the near future. The estimate may be based on other factors as well.

In step 212, The RBS 100 selects one of the computer jobs on the worklist corresponding to the selected resource. The RBS 100 schedules the selected computer job for execution to use the selected computer resource. The RBS 100 makes the selection based on the utilization of the particular resource and the utilization criterion of at least one of the computer jobs on the worklist for the particular computer resource. For example, if the utilization of the selected resource is 60 percent and the utilization criterion of a particular computer job is that the selected resource has less than 40 percent utilization, then the particular computer job is not scheduled, as the utilization criterion is not satisfied. In this case, the RBS 100 could select another computer job and schedule that computer job if its utilization criterion allows the selected resource to have 60 percent utilization.

By repeating at least some of the steps of process 200 in order to schedule one computer job after another, the RBS determines a scheduling order for computer jobs.

In step 214, the RBS 100 stores resource utilization information for the computer job that just executed. The RBS 100 may later use this resource utilization information to determine utilization criteria for the computer job.

Micro-Jobs

In one embodiment, the RBS 100 schedules micro-jobs. Micro-jobs have a size that allows a particular micro-job to complete within an allotted time for which the particular micro-job owns a resource used to execute the processing job, in one embodiment. In one embodiment, each micro-job is such a size that it will complete within its allotted time. However, it may be that some of the micro-jobs are too large to complete execution within their allotted time.

In one embodiment, the allotted time is a quantum. A quantum is a time slice given to a portion of computer code (e.g., a thread) during which time that code portion owns the CPU resource. Different operating systems used different quanta. Moreover, the quantum assigned to a particular code portion may change based on circumstances during runtime. For example, an O/S might increase or decrease the size of the quantum allotted to a thread. In one embodiment, a computer job is divided into micro-jobs based on the size of the quantum that is expected to be allocated to the computer job. In another embodiment, a computer job is divided into micro-jobs based on the size of the quantum that has been allocated to the computer job. The determination as to what portions of the computer job should be split off as micro-jobs may be made either prior to runtime or during runtime.

The micro-jobs are substantially smaller (for example, the smallest) work units that can be completed as a single unit while safely allowing for a pause in execution until the next micro-job executes, in accordance with one embodiment. By safely allowing for a pause in execution, it is meant that the execution of a particular micro-job can be delayed without affecting the outcome that results from execution of the all of the micro-jobs.

A micro-job may be a part of a thread. For example, a thread may be divided into multiple micro-jobs. These micro-jobs may be scheduled similar to how a thread is scheduled. However, as previously stated, a micro-job will complete its execution if allowed to execute for a quantum or other time period for which it owns a processing resource, in one embodiment.

A micro-job may only need a very small amount of resources (e.g., CPU time, memory allocation) at any one time. Such minimal use of resources at any one time may result in a stealthy process. Keeping the micro-jobs small allows the computer job to use only a small amount of computer resources at one time. Thus, execution of a micro-job consumes a sufficiently small amount of resources so as to not significantly impact performance of other applications in the computer system, in accordance with one embodiment of the present invention.

Example API

An embodiment of the present invention is an API for allowing an application to specify various resource utilization parameters. The RBS 100 has such an API, in one embodiment. Applications can use the API to specify utilization criteria for computer jobs (e.g., processes, threads, micro-jobs, or other code portions). The example API has the following resource threshold parameters for CPU, disk, and network.
 CPU Utilization threshold
 Pending Disk I/O Count threshold
 Network Utilization threshold The above parameters can be specified for each computer job. For example, for a computer job that uses the network, a network threshold may be used. However, the network threshold could be zero for computer jobs that do not use the network. Thus, fine-grained resource management is provided for, in accordance with an embodiment of the present invention.

As a particular example, the application can request that a particular computer job be executed only if the CPU utilization is below 50 percent, and the I/O Disk Utilization is below 40 percent, and network traffic is below 60 percent. Any combination of the resource threshold factors can be used, including none at all. The CPU utilization threshold differentiates between RBS use of the CPU as opposed to that of any other job, in accordance with an embodiment of the present invention.

The following two parameters are used to specify an interval over which utilization should be measured.
 CPU Utilization Window
 Network Utilization Window The CPU Utilization Window parameter defines a time window over which CPU utilization is calculated. For example, CPU utilization over the last n milliseconds is averaged. The network utilization window defines a time window over which network utilization is calculated. These parameters may be internal to the RBS 100. However, an application may override these parameters. The pending disk I/O is absolute at any point in time and thus it does not have to be calculated.

A mandatory idle time parameter may be passed from the application to the RBS to control how the computer jobs are spread out over time. The mandatory idle time parameter is optional. Furthermore, when used, the mandatory idle parameter may have a value of zero.
 Mandatory Idle Time The RBS keeps track of "idle time," which is defined as system idle time after all computer jobs have executed. For example, application(s) can worklist up computer jobs with the RBS. When there are no computer jobs on the resource-based worklists 120, the RBS waits for the specified Mandatory Idle Time and then wakes up and authorizes the application(s) to perform additional work. For example, a defragmenter might first execute a number of computer jobs to defragment a disk drive, then be paused by the RBS computer job scheduler. After the specified Mandatory Idle Time, the RBS calls the defragmenter to authorize additional work. For example, the defragmenter might execute a clean-up job, such as releasing memory. Mandatory Idle Time can be a default parameter that can be adjusted by an application.

The following parameters relate to waiting to execute a computer job when resource utilization is above a threshold.
 Wait Time
 Maximum Wait Time If the RBS determines that resource utilization is currently too high to execute a computer job, the RBS waits for the specified Wait Time and then re-checks resource utilization. The Wait Time parameter can be increased each time the RBS determines that resource utilization is too high. For example, the RBS can increase the Wait Time parameter until the Max Wait Time is reached. These parameters can be specified by the application when it is first started. An application can adjust these parameters during its run time.

While the example API uses time (e.g., ms) to specify various parameters, other measures such as quanta may be used.

Variations

The RBS 100 is a part of an operating system, in one embodiment. In another embodiment, the RBS 100 is a stand-alone application that facilitates scheduling of computer jobs for other applications. In still another embodiment, the RBS 100 is integrated into an application program and schedules for that particular application. For example, the RBS 100 may be integrated into a disk defragmentation program or a virus detection program.

If the RBS 100 executes outside of the operating system, the RBS 100 self-limits in its own resource utilization, in one embodiment. For example, the RBS 100 monitors its own resource utilization and if its own resource utilization gets too high, the RBS 100 makes a request to the operating system to stop scheduling the RBS 100 for a period of time.

Further Examples

The following examples illustrate ways in which the RBS 100 may operate. However, the RBS 100 is not required to operate as described in these examples. As one example, the RBS 100 schedules multiple computer jobs for a particular application. Some of these computer jobs may require disk I/O. The RBS 100 may analyze disk utilization as a condition for scheduling the computer jobs. If disk utilization is too high, then the RBS 100 waits until disk utilization drops to schedule a particular computer job of the application. The RBS 100 continues to monitor the disk I/O utilization, and allows another computer job to be scheduled if no other application is seeking access to disk I/O. However, if another application seeks utilization of disk I/O, then the RBS 100 does not allow another computer job to be scheduled, in this embodiment. Thus, other application(s) can utilize the disk I/O.

As another example, the RBS 100 may analyze network activity. If network traffic is too high, the RBS 100 will not schedule any computer job of the application until traffic slows. If network traffic is low enough, then the RBS 100 schedules a computer job for execution. The RBS 100 continues to check to make sure that network traffic stays low enough. If network traffic stays low enough, another computer job may be scheduled. However, if traffic gets too high, no further computer jobs are scheduled to execute. In these last two examples, the computer job may be a micro-job. However, that is not required.

Hardware Overview

Figure 3:
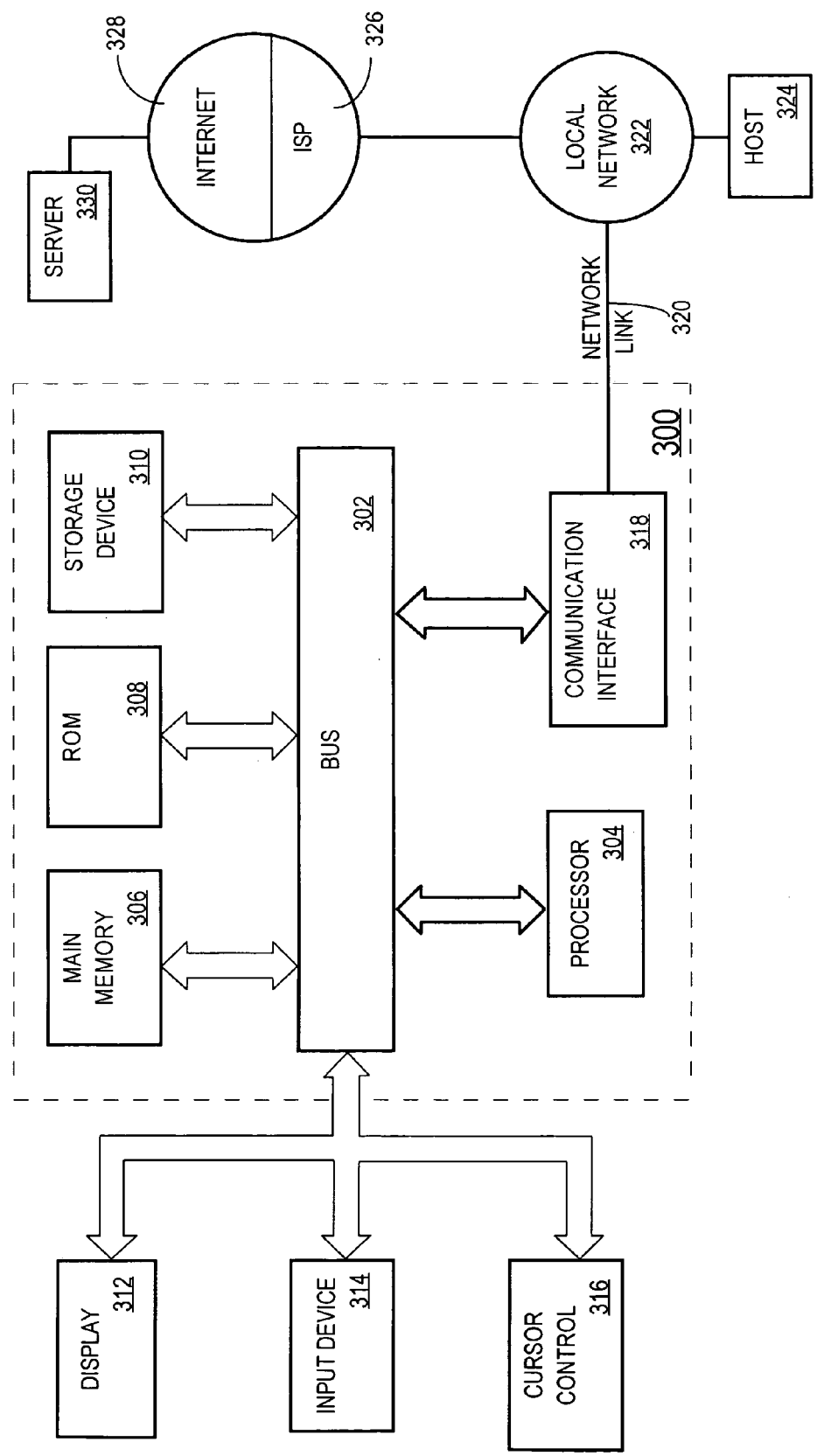
FIG. 3 is a block diagram that illustrates a computer system upon which an embodiment of the invention may be implemented.

FIG. 3 is a block diagram that illustrates a computer system 300 upon which an embodiment of the invention may be implemented. Steps of process 200 are stored as instructions one or more of the computer-readable media of system 300 and executed on the processor of computer system 300. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions. The computer system 300 can have any number of processors 304. For example, computer system 300 is a multi-processor system, in one embodiment. The processor 304 can have any number of cores. In one embodiment, the processor 304 is a multi-core processor 304. Computer system 300 can be used in a hyper threaded machine.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    identifying a plurality of resource worklists corresponding respectively to each of a plurality of resources of different types, each resource worklist comprising computer jobs waiting to utilize a respective resource;
    identifying one or more attributes of each of the plurality of resources;
    selecting an order for scheduling use of the plurality of resources based on the attributes of each of the plurality of resources; and
    based on the order: selecting a particular resource, for scheduling, from the plurality of resources,
    after selecting the particular resource for scheduling:
    selecting, for execution using the particular resource, a particular computer job from a plurality of computer jobs on a resource worklist corresponding to the resource; and
    scheduling the use, of the plurality of resources in the selected order, by one or more corresponding computer jobs, wherein scheduling the use comprises scheduling the use of the particular resource by the particular computer job;
    wherein the method is executed by at least one device including a hardware processor.

2. The method of claim 1, wherein selecting the order for scheduling the use of the plurality of resources based on the attributes of each of the plurality of resources comprises: placing a first resource before a second resource in the order responsive to determining that a first priority associated with the first resource is higher than a second priority associated with the second resource.

3. The method of claim 1, wherein selecting the order for scheduling the use of the plurality of resources based on the attributes of each of the plurality of resources comprises: placing a first resource before a second resource in the order responsive to determining that a first speed associated with the first resource is slower than a second speed associated with the second resource.

4. The method of claim 1, wherein the plurality of resources comprises a central processing unit (CPU) and a disk I/O, and the disk I/O is placed before the CPU in the selected order.

5. The method of claim 1, wherein the plurality of resources comprises a disk I/O and a network I/O, and the disk I/O is placed before the network I/O in the selected order.

6. A non-transitory computer readable medium comprising instructions which, when executed by one or more hardware processors, causes performance of operations comprising:
    identifying a plurality of resource worklists corresponding respectively to each of a plurality of resources of different types, each resource worklist comprising computer jobs waiting to utilize a respective resource;
    identifying one or more attributes of each of the plurality of resources;
    selecting an order for scheduling use of the plurality of resources based on the attributes of each of the plurality of resources; and
    based on the order: selecting a particular resource, for scheduling, from the plurality of resources,
    after selecting the particular resource for scheduling:
    selecting, for execution using the particular resource, a particular computer job from a plurality of computer jobs on a resource worklist corresponding to the resource; and scheduling the use, of the plurality of resources in the selected order, by one or more corresponding computer jobs, wherein scheduling the use comprises scheduling the use of the particular resource by the particular computer job.

7. The medium of claim 6, wherein selecting the order for scheduling the use of the plurality of resources based on the attributes of each of the plurality of resources comprises: placing a first resource before a second resource in the order responsive to determining that a first priority associated with the first resource is higher than a second priority associated with the second resource.

8. The medium of claim 6, wherein selecting the order for scheduling the use of the plurality of resources based on the attributes of each of the plurality of resources comprises: placing a first resource before a second resource in the order responsive to determining that a first speed associated with the first resource is slower than a second speed associated with the second resource.

9. The medium of claim 6, wherein the plurality of resources comprises a central processing unit (CPU) and a disk I/O, and the disk I/O is placed before the CPU in the selected order.

10. The medium of claim 6, wherein the plurality of resources comprises a disk I/O and a network I/O, and the disk I/O is placed before the network I/O in the selected order.

11. A system, comprising:
at least one device including a hardware processor;
the system being configured to perform operations comprising:
identifying a plurality of resource worklists corresponding respectively to each of a plurality of resources of different types, each resource worklist comprising computer jobs waiting to utilize a respective resource;
identifying one or more attributes of each of the plurality of resources;
selecting an order for scheduling use of the plurality of resources based on the attributes of each of the plurality of resources; and
based on the order: selecting a particular resource, for scheduling, from the plurality of resources,
after selecting the particular resource for scheduling:
selecting, for execution using the particular resource, a particular computer job from a plurality of computer jobs on a resource worklist corresponding to the resource; and
scheduling the use, of the plurality of resources in the selected order, by one or more corresponding computer jobs, wherein scheduling the use comprises scheduling the use of the particular resource by the particular computer job.

12. The system of claim 11, wherein selecting the order for scheduling the use of the plurality of resources based on the attributes of each of the plurality of resources comprises: placing a first resource before a second resource in the order responsive to determining that a first priority associated with the first resource is higher than a second priority associated with the second resource.

13. The system of claim 11, wherein selecting the order for scheduling the use of the plurality of resources based on the attributes of each of the plurality of resources comprises: placing a first resource before a second resource in the order responsive to determining that a first speed associated with the first resource is slower than a second speed associated with the second resource.

14. The system of claim 11, wherein the plurality of resources comprises a central processing unit (CPU) and a disk I/O, and the disk I/O is placed before the CPU in the selected order.

15. The system of claim 11, wherein the plurality of resources comprises a disk I/O and a network I/O, and the disk I/O is placed before the network I/O in the selected order.

* * * * *